(No Model.) 2 Sheets—Sheet 1.

R. T. D. BROUGHAM.
ROLLER BEARING UNDERCARRIAGE.

No. 601,336. Patented Mar. 29, 1898.

Witnesses
Inventor (No Model.) 2 Sheets—Sheet 2.

R. T. D. BROUGHAM.
ROLLER BEARING UNDERCARRIAGE.

No. 601,336. Patented Mar. 29, 1898.

UNITED STATES PATENT OFFICE.

REGINALD THOMAS DUDLEY BROUGHAM, OF LONDON, ENGLAND, ASSIGNOR TO THE ELECTRICAL VEHICLE SYNDICATE, LIMITED, OF SAME PLACE.

ROLLER-BEARING UNDERCARRIAGE.

SPECIFICATION forming part of Letters Patent No. 601,336, dated March 29, 1898.

Application filed December 13, 1897. Serial No. 661,731. (No model.)

*To all whom it may concern:*

Be it known that I, REGINALD THOMAS DUDLEY BROUGHAM, a subject of the Queen of Great Britain, residing at 22ª Dorset street, Portman Square, London, in the county of Middlesex, England, have invented a Roller-Bearing Locking or Undercarriage Applicable Especially to Electrical and other Motor-Vehicles, of which the following is a specification.

The object of this invention is mainly to substitute rolling for sliding friction in the locking or undercarriages of vehicles. To effect this, the rims of the two rings or wheels of the locking or undercarriage, which are concentric and one above the other, are each formed of angle-iron section, and between them they inclose an annular space approximately square in cross-section, the rim of one wheel forming the top and one side of the square and the rim of the other wheel forming the bottom and other side of the square. Into this annular space is inserted a loose ring carrying a series of rollers. Some of the rollers are on horizontal axes. The remainder of the rollers are on vertical axes. The rollers on the horizontal axes keep the two wheels slightly apart from one another and the rollers on the vertical axes keep them concentric. A bolt passing down through a hollow stem which extends downward from the center of the upper wheel and through a cross-bar, forming part of the lower wheel, holds the two wheels from separating from one another.

Figure 1:
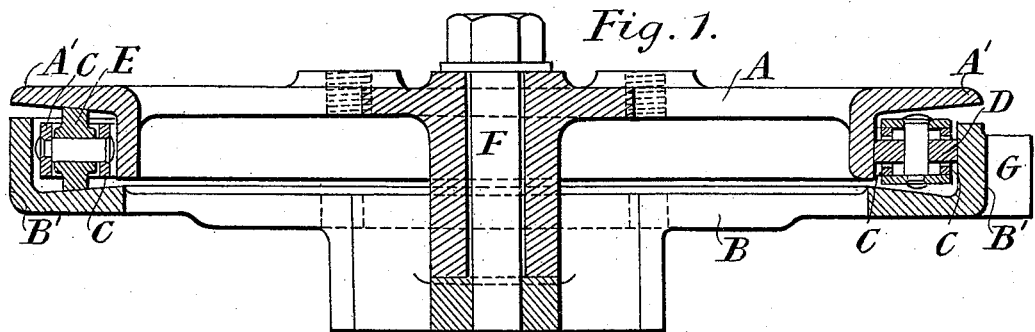
Figure 2:
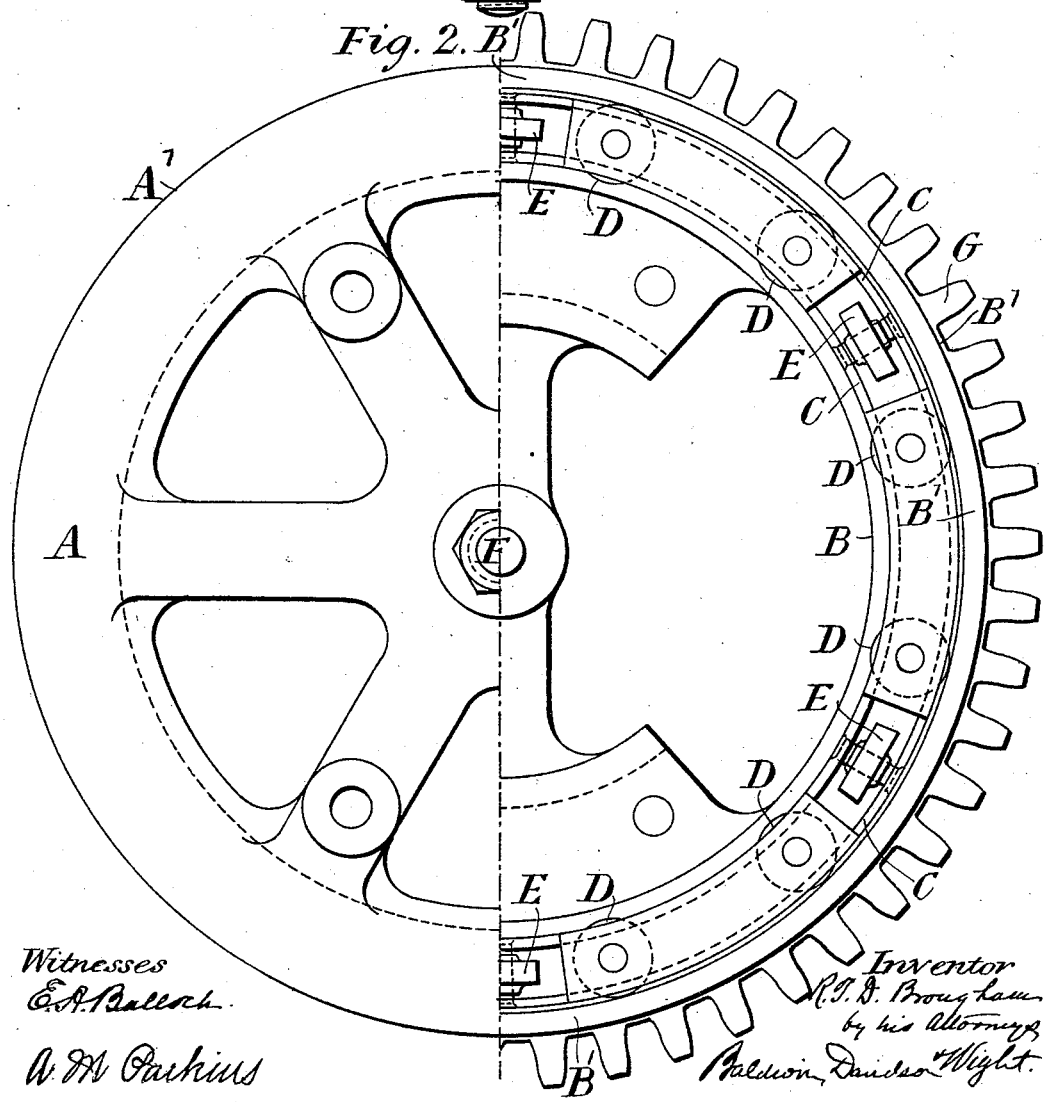
Figure 3:
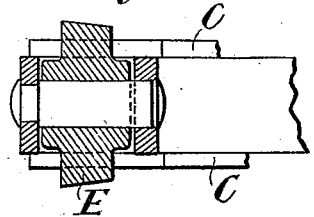
Figure 5:
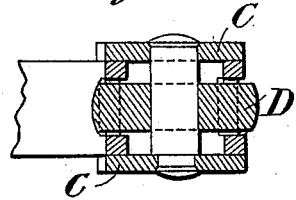
Figure 4:
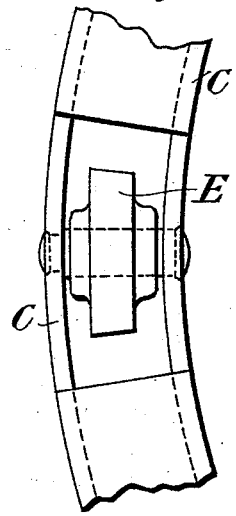
Figure 6:
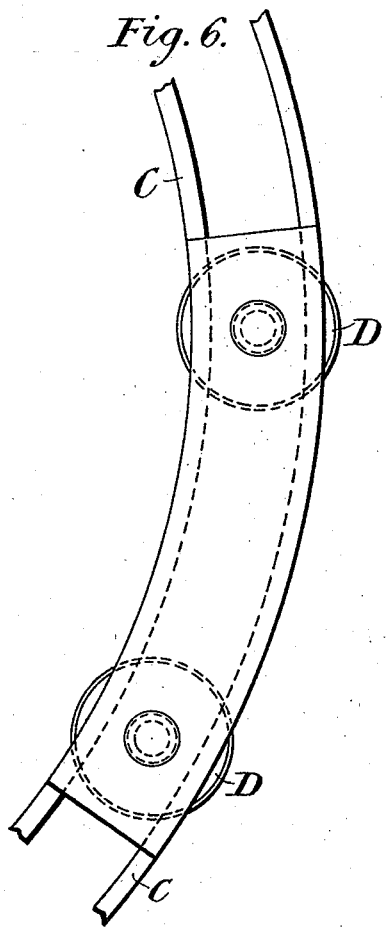

Figure 1 of the drawings annexed is a vertical section of a locking or undercarriage for a vehicle formed in the above way. Fig. 2 is a plan, one-half in section, of the same. Fig. 3 is a vertical section, and Fig. 4 a plan on a larger scale taken through one of the conical rollers. Figs. 5 and 6 are similar views taken through one of the horizontal rollers.

A' is the rim, of angle-iron form, of the upper wheel A; B', the rim of the lower wheel B.

C is the ring inserted into the annular space inclosed between the rims of the two wheels.

D are the horizontal rollers, which keep the wheels A and B concentric, and E are the vertical rollers, which keep the two wheels at a slight distance apart from one another.

F is the bolt, which keeps the two wheels from moving away from one another.

The rollers E are, as shown, made conical, radiating to a point at the center of the ring C. The surfaces of the rims of the two wheels A and B, which bear against them, are correspondingly coned. The ring C is formed as a hollow square in cross-section. It is made up of two concentric rings, one smaller than and within the other, held together, as shown, by the horizontal axes of the rollers E, and of two other rings or sections of rings held against the upper and under edges of the two first-mentioned rings by the vertical axes of the rollers D. The diameter of the rollers is slightly greater than the width or depth of the hollow ring C, so that the rollers project through the sides and top and bottom of this ring and keep the ring from coming into contact with the rims of the two wheels A and B.

The lower or locking wheel B is to be attached to the cross-bar, to which the fore axle of a vehicle is secured, by interposed springs. The upper wheel A is to be fixed to the under side of the fore part of a vehicle. G is a toothed wheel which may be formed around the outer circumference of the rim B' of the wheel B for a worm or toothed wheel worked by steering mechanism to gear into.

What I claim is—

1. A roller-bearing locking or swiveling undercarriage composed of two concentric wheels one above the other and having their rims of angle-iron form—the two rims inclosing an annular space into which a ring carrying horizontal and vertical rollers is inserted—the horizontal rollers being made conical and serving to keep the two wheels apart and the vertical rollers serving to keep them concentric.

2. The combination of the rims A' B' of the two wheels A B inclosing an annular space, the hollow ring C inserted into this space and carrying horizontal rollers D and vertical rollers E and the bolt F which keeps the two wheels A B from moving apart.

3. The combination of the two rims A' B' inclosing an annular space and the hollow ring C inserted into this space and carrying horizontal rollers D and vertical rollers E—such hollow ring being formed of two concentric rings one smaller than and within the other held together by distance-pieces which may be the axes of the rollers E and of two other rings or sections of rings held against the upper and under edges of the first rings by distance-pieces which may be the axes of the rollers D.

REGINALD THOMAS DUDLEY BROUGHAM.

Witnesses:
 WALTER CHARLES BUSEY,
 FRANK HOWELL HAYS.